3,301,807
STABILIZED, CONCENTRATED POLYTETRAFLU-
OROETHYLENE DISPERSIONS CONTAINING
NON-IONIC SURFACTANTS
Juzaemon Hoashi, Osaka-fu, Japan, assignor, by mesne
assignments, to Thiokol Chemical Corporation, Tren-
ton, N.J., a corporation of Delaware
No Drawing. Filed Apr. 7, 1964, Ser. No. 358,100
Claims priority, application Japan, Apr. 11, 1963,
38/18,945
10 Claims. (Cl. 260—29.6)

This invention relates to aqueous colloidal polytetra-
fluoroethylene dispersions and, more particularly, to a
process for producing stabilized, concentrated polytetra-
fluoroethylene dispersions. The invention provides an
improved process for producing stabilized, concentrated
polytetrafluoroethylene dispersions by the concentration
and subsequent stabilization of relatively dilute aqueous
colloidal dispersions of the polymer, as well as the im-
proved stabilized, concentrated polytetrafluoroethylene
dispersions which are produced by this process. As used
herein, the term "polytetrafluoroethylene" defines any
polymer, including linear and branched homopolymers,
copolymers, interpolymers, block polymers and graft
polymers which contains the tetrafluoroethylene group
(—CF₂CF₂—) in its molecular structure. Such polymers
include polytetrafluoroethylene homopolymers as well as
copolymers of tetrafluoroethylene and other fluoroolefin
comonomers, such as hexafluoropropene and trifluoro-
chloroethylene.

The emulsion polymerization of tetrafluoroethylene, in
which tetrafluoroethylene (either alone or with other
fluoroolefin comonomers) is polymerized by emulsifying
the monomer in an aqueous reaction medium containing
a perfluoro- or polyfluoro-substituted emulsifying agent
for the tetrafluoroethylene (and which functions to
emulsify the polymer) as well as a water-soluble radical
catalyst system, yields aqueous colloidal dispersions of
polytetrafluoroethylene having a polymer solids content
generally in the range from 30 to 50 percent by weight,
and more often between 30 and 45 percent by weight.
Analyses of the aqueous colloidal polytetrafluoroethyl-
ene dispersions produced by emulsion polymerization of
tetrafluoroethylene always indicate the presence of a small
amount (generally from about 0.1 to about 0.5 percent
by weight) of the emulsifying agent, all of which com-
pounds, whether linear or branched, are characterized
by a high proportion of fluorine atoms in their molecular
structure. A typical process for producing these poly-
tetrafluoroethylene dispersions is described in the United
States Letters Patent to Kenneth L. Berry et al. No.
2,559,752, granted July 10, 1951, as well as in my copend-
ing United States patent application Serial No. 356,034,
filed March 31, 1964, and entitled "Emulsion Polymeriza-
tion of Tetrafluoroethylene."

Although these polytetrafluoroethylene dispersions may
be used without further stabilization or concentration to
form coatings, their relative dilution requires the work-
piece to be repeatedly immersed in or sprayed with the
dispersion before an appreciable coating of polytetra-
fluoroethylene may be applied. For some purposes,
notably the production of thin films of polytetrafluoro-
ethylene, the aqueous dispersions produced by an emul-
sion polymerization process are completely useless with-
out further stabilization and concentration. Present com-
mercial practice, therefore, requires the dilute aqueous
dispersion to undergo further concentration prior to most
uses, which concentration must be carefully controlled to
avoid irreversibly coagulating the polymer particles.

Basically, there are two methods presently used for
concentrating dilute aqueous colloidal dispersion of poly-
tetrafluoroethylene, the first of which is based upon pass-
ing direct current through the dispersion which, in turn,
causes the polymer particles to migrate towards the
cathode. This electrolytic method is very sensitive and
difficult to control, requiring particularly stable disper-
sions, careful regulation of the current, and the use of
diaphragms to avoid coagulation at the cathode. As a
practical matter, the electrolytic concentration technique
is sufficiently limited that it cannot be used in the con-
centration of many polytetrafluoroethylene dispersions.

The second method for concentrating dilute aqueous
colloidal dispersions of polytetrafluoroethylene is based
upon the phenomenon that all colloids show reduced
solubility and may be precipitated by the addition of
certain surface active compounds, particularly at a pH
close to the cloud point of the colloid and those tempera-
tures at which the surface active agent itself possesses
lower solubility. This technique has been applied to poly-
tetrafluoroethylene dispersions, as described in the United
States Letters Patent to Barnard M. Marks et al. No.
3,037,953, granted June 15, 1962, and consists essentially
of (a) adding to a dilute aqueous colloidal dispersion of
polytetrafluoroethylene, which contains from 30 to 50
percent by weight of polymer solids and a small amount
of a polyfluoro-substituted emulsifying agent, a sufficient
amount of base to approach the cloud point of the col-
loidal polymer together with a small amount of a
nonionic surfactant having a structure represented by
the formula

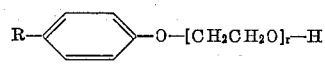

in which R is an alkyl group containing from 8 to 10
carbon atoms, and $r$ is an integer equal to from 1 to 2
more than the number of carbon atoms in the alkyl
radical R, (b) heating the mixture to a temperature from
50° C. to 80° C. until it begins to cloud and separates
into a clear supernatant and a sediment, and (c) decant-
ing the clear supernatant and then cooling the remaining
sediment to room temperature, yielding a concentrated
polytetrafluoroethylene dispersion.

This technique presents several distinct disadvantages
in the concentration of dilute aqueous polytetrafluoro-
ethylene dispersions, the foremost disadvantage being
the tendency of the polytetrafluoroethylene particles to
coagulate, particularly when the mixture is heated to
temperatures between 50° C. and 80° C. Moreover,
the addition of base to the mixture to adjust the pH
close to the cloud point of the colloidal polymer par-
ticles has the effect of lowering the dielectric constant
of any coating or film produced from the concentrated
dispersion. Lastly, the use of this concentration tech-
nique frequently requires long time to achieve solids
concentrations of the order of magnitude of 60 percent
by weight or higher.

By mixing an alkylphenoxypolyoxyethylene glycol
(or "concentrating" nonionic surfactant) having a cer-
tain molecular weight range into an aqueous colloidal
dispersion of polytetrafluoroethylene (10 to 50 percent
polymer solids content) to separate the dilute aqueous
dispersion into a relatively clear supernatant layer and
a sedimentary layer and thereby concentrate the poly-
tetrafluoroethylene dispersion in the sedimentary layer,
and then subsequently mixing a second (or "stabilizing")
alkylphenoxypolyoxyethylene glycol surfactant into the
sedimentary layer to stabilize the dispersion, it has been
found possible to concentrate and stabilize the polytetra-
fluoroethylene dispersion at room temperatures, and in
no event at temperatures in excess of about 45° C., with-
in relatively short periods of time without any coagula-
tion of the polytetrafluoroethylene particles. This selec-
tive use of "concentrating" and "stabilizing" nonionic surfactants yields very concentrated dispersions (with 60 to 75 percent polymer solids content), which may be diluted to a desired solids content without affecting the stability of the colloidal suspension, thereby permitting the polytetrafluoroethylene dispersion to be used over a wide range of viscosities.

After careful study of surfactant properties of many nonionic alkylphenoxypolyoxyethylene glycols in polytetrafluoroethylene dispersions, it has demonstrated that the aforementioned results are only possible by using a nonionic surfactant having a structure represented by the formula

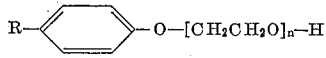

in which R is an alkyl group containing from 8 to 10 carbon atoms, and $n$ is an integer having a value in the range from $[r-1.5]$ to $[r+0.5]$, where $r$ is equal to the number of carbon atoms in the alkyl radical R, as the "concentrating" nonionic surfactant to separate the dilute, aqueous colloidal dispersion into a relatively clear supernatant layer and a sedimentary layer containing the polytetrafluoroethylene. The concentrating nonionic surfactant should be thoroughly mixed into the aqueous colloidal polytetrafluoroethylene dispersion in an amount in the range from about 6 to about 20 percent by weight, based on the weight of the polymer. Certain advantages have also been found when the concentrating nonionic surfactant is mixed into the aqueous colloidal dispersion in two or more portions.

The structure of the second, or "stabilizing" nonionic surfactant which is used to stabilize the concentrated polytetrafluoroethylene dispersion may be represented by the formula

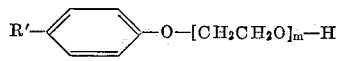

in which R' is an alkyl radical containing from 8 to 10 carbon atoms (and preferably although not necessarily the same as the alkyl radical R in the concentrating nonionic surfactant), and $m$ is an integer equal to at least $[r'+1]$ but less than 20 where $r'$ is equal to the number of carbon atoms in the alkyl radical R'.

Based on these discoveries, the invention provides an improved process for producing stabilized, concentrated polytetrafluoroethylene dispersions which comprises (a) thoroughly mixing from about 6 to about 20 percent by weight of a concentrating nonionic surfactant having a structure represented by the formula

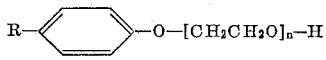

in which R is an alkyl group containing from 8 to 10 carbon atoms, and $n$ is an integer having a value in the range from $[r-1.5]$ to $[r+0.5]$, where $r$ is equal to the number of carbon atoms in the alkyl radical R, into an aqueous colloidal dispersion of polytetrafluoroethylene having a polymer solids content in the range from about 10 to about 50 percent by weight and containing a small amount of a polyfluoro-substituted emulsifying agent for the polymer, the percentage of the nonionic surfactant mixed into the aqueous colloidal dispersion being based upon the weight of the polymer, thereby separating the aqueous colloidal dispersion into a relatively clear supernatant layer and a sedimentary layer and concentrating the polytetrafluoroethylene dispersion in the sedimentary layer;

(b) separating the sedimentary layer from the supernatant layer and then thoroughly mixing into the sedimentary layer a small amount of a stabilizing nonionic surfactant having a structure represented by the formula

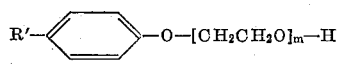

in which R' is an alkyl group containing from 8 to 10 carbon atoms, and $m$ is an integer equal to at least $[r'+1]$ but less than 20, where $r'$ is equal to the number of carbon atoms in the alkyl radical R', thereby stabilizing the concentrated polytetrafluoroethylene dispersion; and (c) recovering the stabilized, concentrated polytetrafluoroethylene dispersion, which contains from about 60 to about 75 percent by weight of polytetrafluoroethylene particles having an average diameter in the range from about 0.05 to about 0.5 micron.

When the concentrating nonionic surfactant is added to the dilute, aqueous colloidal polytetrafluoroethylene dispersion in two or more separate portions, the last portion being added at least about 30 minutes after the first portion, the final concentration of the polymer dispersion is much greater (generally about 70 percent solids content) and a lesser amount of the perfluoro- or polyfluoro-substituted emulsifying agent is contained in the final dispersion than when all of the concentrating nonionic surfactant is added to the dispersion at the inception of the concentrating step. For best results, no more than about one-half, and preferably one-third, of the concentrating nonionic surfactant should be added in the first portion, with the balance being incorporated in the dispersion (with continued mixing in the interim) about 30 minutes after the addition of the first portion.

Concentration of the polytetrafluoroethylene in accordance with the process of the invention may take place at any temperature within the range from 0° C. to about 45° C., the best results being obtained by mixing the concentrating nonionic surfactant (either in one or in two separate portions) into the aqueuos colloidal dispersion while maintaining the temperature of the dispersion at room temperature (ca. 25° C. to 30° C.), and then increasing the temperature to about 40° C. There is no necessity to use temperatures in excess of about 45° C., and consequently coagulation (or irreversible agglomeration) of the polytetrafluoroethylene particles may be avoided. Although it is not necessary, small amounts of a base, such as ammonium hydroxide, sodium hydroxide or sodium carbonate, may be added to neutralize any hydrofluoric acid which may have been formed during the emulsion polymerization.

After the concentrating nonionic surfactant has been thoroughly mixed into the aqueous colloidal dispersion of polytetrafluoroethylene in accordance with the invention, the dispersion separates after mixing or stirring has ceased into a relatively clear supernatant layer and a sedimentary layer in which substantially all of the polytetrafluoroethylene particles are concentrated. Since this sedimentary layer generally possesses a viscosity in the range from about 500 to about 1000 centipoises, and may be used only for limited purposes, the sedimentary layer must be further stabilized so that it can be diluted to concentrations between 20 and 70 percent by weight solids content, and thereby be adaptable for use over a wide range of viscosities.

The second step in the process of the invention, in which the sedimentary layer containing substantially all of the polytetrafluoroethylene is stabilized, requires that the sedimentary layer be separated from the relatively clear supernatant layer, and that the sedimentary layer be stabilized by the addition to the sedimentary layer of a small amount, generally from about 1 to about 10 percent by weight, and for most purposes from about 2 to about 6 percent by weight, of a stabilizing nonionic surfactant (preferably as a 50% aqueuos solution) in which the number of ethylene oxide units is carefully controlled. To achieve stabilization of the concentrated polytetrafluoroethylene dispersion, the number of ethylene oxide units (derived, of course, from ethylene oxide) in the stabilizing nonionic surfactant must be at least one more than the number of carbon atoms in the alkyl substituent, the larger the number of ethylene oxide units, the lower the reduction in viscosity of the polytetrafluoroethylene dispersion when an aqueous solution of the stabilizing nonionic surfactant is added, and the greater the sedimentation stability.

By careful selection of the stabilizing nonionic surfactant, it is possible to obtain stabilized, concentrated polytetrafluoroethylene dispersions having the desired viscosity. The stabilizing nonionic surfactant should not contain more than 20 ethylene oxide units in its molecular structure, since surfactants with more than 20 ethylene oxide units have relatively low water solubilities and are rather ineffective for stabilizing polytetrafluoroethylene dispersions. Experimental evidence has demonstrated that the optimum sedimentation stability is achieved when the stabilizing nonionic surfactant possesses the following structure:

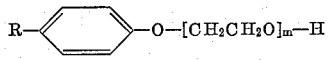

in which R is the same alkyl radical as that contained in the concentrating nonionic surfactant, and $m$ is an integer having a value in the range from $[2(r+1)-n]$ and $[2(r+3)-n]$, where $r$ and $n$ represent the values previously defined for these variables in the concentrating nonionic surfactant.

The following examples are illustrative of the ease with which dilute, aqueous colloidal dispersions of polytetrafluoroethylene may be concentrated and then stabilized in accordance with the process of the invention. In each of these examples, the initial polytetrafluoroethylene dispersion was produced by the emulsion polymerization of tetrafluoroethylene described in the aforementioned Berry et al. Patent No. 2,559,752.

*Example I*

To an aqueous colloidal dispersion of polytetrafluoroethylene having a polymer solids content of 35 percent by weight was added 5 percent by weight (based on the weight of the polymer) of

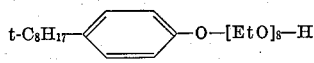

and the mixture stirred for 30 minutes at room temperature (30° C.). At the end of this period, an additional 10 percent by weight (based on the weight of the polymer) was added and mixed into the dispersion and stirring continued for an additional 30 minutes. When the dispersion became quiescent, it separated into a relatively clear supernatant layer and a sedimentary layer which contained the polymer. After standing for 10 hours, the supernatant layer was decanted and the sedimentary layer was found to possess a specific gravity of 1.60 and a solids content of about 72 percent. Treatment of the sedimentary layer by the addition of 3.5 percent by weight of

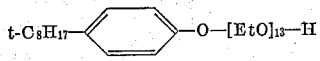

(based on polymer weight) in the form of a 50 percent aqueous solution, with continued mixing over 3 hours, yielded a stabilized, concentrated polytetrafluoroethylene dispersion having 60 percent solids. Electron microscopy of the sedimentary layer and of the final stabilized, concentrated polytetrafluoroethylene dispersion revealed no coagulation of the polymer particles. Almost identical results were accomplished using the same surfactants in the same concentrations, but adding 0.05 percent of ammonium hydroxide to alter the pH, demonstrating the relative noncriticality of pH on the process.

When the process was further repeated, and the entire 15 percent by weight of the first (or concentrating surfactant) added initially rather than as two separate portions aggregating the same concentration, the solids content of the sedimentary layer was 63 percent by weight after 10 hours, and 70 percent by weight after 25 hours. Once again, electron microscope examination of both the sedimentary layer and the final product revealed no coagulation of the polymer particles. When the sedimentary layer was heated to 50° C., however, particle coagulation was observed.

*Examples II to IV*

To show the differences which occurred when an aggregate of 9 percent by weight, based on the polymer weight, of the concentrating nonionic surfactant was mixed into the aqueous colloidal dispersion (35 percent polymer solids content), adding all 9 percent at the beginning, or 6 percent at the beginning and 3 percent after 30 minutes, or 3 percent at the beginning and 6 percent after 30 minutes of stirring, three separate tests were carried out under the conditions described in Example I. In each of these tests, designated as Examples II to IV, respectively, and summarized in Table I, the aqueous colloidal dispersion was treated with an aggregate of 9 percent by weight (based on polymer weight) of

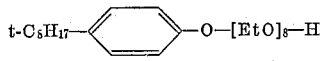

and the solids content of the sedimentary layer measured after 10 hours. After decantation of the supernatant layer, each sedimentary layer was stabilized with 3.5 percent by weight (based on the polymer) of

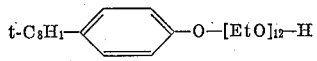

in the form o fa 50 percent aqueous solution, and the final viscosity measured.

TABLE I

| Example | Initial Concentration of Aqueous Dispersion (Percent) | t-C$_8$H$_{17}$—⟨⟩—O—(EtO)$_8$—H | | Concentration of Dispersion After 10 Hours (Percent) | Concentration of Emulsifying Agent in Final Dispersion (Percent) | Viscosity of Final Dispersion (centipoises) |
|---|---|---|---|---|---|---|
| | | First Addition (Percent/polymer) | Second Addition (Percent/polymer) | | | |
| II | 35 | 9 | 0 | 63 | 0.2 | 20 |
| III | 35 | 6 | 3 | 67 | 0.17 | 15 |
| IV | 35 | 3 | 6 | 72 | 0.10 | 13 |

*Examples V to XV*

To illustrate the effect of temperature during the concentration of the aqueous colloidal dispersion, as well as the effect of varying the number of ethylene oxide units in the concentrating nonionic surfactant (from 7.5 to 10) while

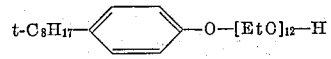

as the stabilizing nonionic surfactant, eleven additional tests were conducted using the procedure described in Example I, in which one-third of the concentrating nonionic surfactant was added in one portion and the balance added 30 minutes thereafter. The results of these tests, which were designated as Examples V to XV, are summarized in Table II. In three of the examples (XI to XIII), 0.2 percent by weight of a base was used to adjust the pH of the aqueous colloidal dispersion during the concentration. Electron microscope examination of the final stabilized, concentrated polytetrafluoroethylene dispersion indicated that whenever temperatures in excess of 50° C. were employed, there was a significant amount of coagulation of the polymer particles.

TABLE II

| Example | t-C$_8$H$_{17}$-⟨⟩-O-(EtO)$_n$-H | | t-C$_8$H$_{17}$-⟨⟩-O-(EtO)$_m$-H | | Electrolyte | | Concentration Temperature (° C.) | Time required for Concentration (hr.) | Concentration of dispersion After 30 hours (percent) |
|---|---|---|---|---|---|---|---|---|---|
| | n | Amount, percent/polymer | m | Amount, percent/polymer | Type | Dispersion | | | |
| V | 7.5 | 9 | 12 | 3.5 | | | 25 | 30 | 74 |
| VI | 7.5 | 9 | 12 | 3.5 | | | 50 | 30 | 75 |
| VII | 10 | 9 | 12 | 3.5 | | | 25 | 30 | |
| VIII | 10 | 9 | 12 | 3.5 | | | 50 | 30 | 60 |
| IX | 10 | 9 | 12 | 3.5 | | | 80 | 30 | 63 |
| X | 8 | 9 | 12 | 3.5 | | | 25 | 25 | 71 |
| XI | 8 | 9 | 12 | 3.5 | NH$_4$OH | 0.02 | 25 | 25 | 70 |
| XII | 8 | 9 | 12 | 3.5 | NaOH | 0.02 | 25 | 25 | 71 |
| XIII | 8 | 9 | 12 | 3.5 | (NH$_4$)$_2$CO$_3$ | 0.02 | 25 | 25 | 72 |
| XIV | 8 | 9 | 12 | 3.5 | | | 50 | 30 | 73 |
| XV | 9 | 9 | 12 | 3.5 | | | 50 | 30 | 65 |

*Examples XVI to XXI*

The effect of varying the number of ethylene oxide units ($m$) in the stabilizing nonionic surfactant

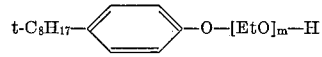

at various concentrations of these surfactants is illustrated in the six examples (designated as Examples XVI to XXI) summarized in Table III. In each of these examples, the sedimentary layer (specific gravity 1.60) containing the concentrated polytetrafluoroethylene dispersion produced in accordance with Example I was treated with varying amounts (as 50 percent solution) of different stabilizing nonionic surfactants, and the viscosity determined for each stabilized, concentrated polytetrafluoroethylene dispersion.

TABLE III

| Example | t-C$_8$H$_{17}$-⟨⟩-O-(EtO)$_m$-H | | Viscosity (centipoises) |
|---|---|---|---|
| | m | Amount (percent) | |
| XVI | 10 | 2.5 | 100 |
| XVII | 10 | 3.5 | 80 |
| XVIII | 12 | 2.5 | 25 |
| XIX | 12 | 3.5 | 20 |
| XX | 15 | 2.5 | 13 |
| XXI | 15 | 3.5 | 13 |

The above examples conclusively demonstrate the advantage of concentrating and stabilizing aqueous colloidal dispersions of polytetrafluoroethylene in accordance with the process of the invention. The improved stabilized, concentrated polytetrafluoroethylene dispersions produced by this process generally contain from about 65 to 75 percent by weight of polytetrafluoroethylene particles having an average diameter in the range from about 0.05 to 0.5 micron, without any coagulated polymer particles, and may be diluted to any desired concentration and viscosity prior to use.

I claim:
1. A process for producing stabilized, concentrated polytetrafluoroethylene dispersions consisting essenially of sequentially
  (a) thoroughly mixing from about 6 to about 20 percent by weight of a concentrating nonionic surfactant having a structure represented by the formula

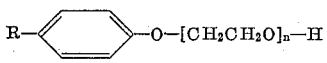

in which R is an alkyl group containing from 8 to 10 carbon atoms, and $n$ is an integer having a value in the range from [$r-1.5$] to [$r+0.5$], where $r$ is equal to the number of carbon atoms in the alkyl radical R, into an aqueous colloidal dispersion of polytetrafluoroethylene having a polymer solids content in the range from about 10 to about 50 percent by weight and containing a small amount of a polyfluoro-substituted emulsifying agent for the polymer, while maintaining the temperature of the aqueous colloidal dispersion in the range from 0° C. to about 45° C., the percentage of the nonionic surfactant mixed into the aqueous colloidal dispersion being based upon the weight of the polymer, thereby separating the aqueous colloidal dispersion into a relatively clear supernatant layer and a sedimentary layer and concentrating the polytetrafluoroethylene dispersion in the sedimentary layer;
  (b) separating the sedimentary layer from the supernatant layer and then thoroughly mixing into the sedimentary layer a small amount of a stabilizing nonionic surfactant having a structure represented by the formula

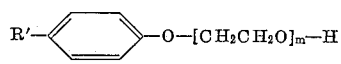

in which R' is an alkyl group containing from 8 to 10 carbon atoms, and $m$ is an integer equal to at least [$r'+1$] but less than 20, where $r'$ is equal to the number of carbon atoms in the alkyl radical R', while maintaining the temperature of the sedimentary layer in the same temperature range, to form a stabilized, concentrated polytetrafluoroethylene dispersion containing from about 65 to about 75 percent by weight of polytetrafluoroethylene particles having an average diameter in the range from about 0.05 to about 0.5 micron and being characterized by the absence of coagulated polymer particles upon electron microscope examination; and
  (c) recovering the resultant stabilized, concentrated polytetrafluoroethylene dispersion.

2. A process for producing stabilized, concentrated polytetrafluoroethylene dispersions consisting essentially of sequentially
  (a) thoroughly mixing from about 6 to about 20 percent by weight of a concentrating nonionic surfactant having a structure represented by the formula

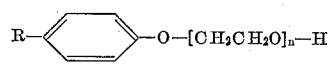

in which R is an alkyl group containing from 8 to 10 carbon atoms, and $n$ is an integer having a value in the range from [$r-1.5$] to [$r+0.5$], where $r$ is equal to the number of carbon atoms in the alkyl radical R, into an aqueous colloidal dispersion of polytetrafluoroethylene having a polymer solids content in the range from about 10 to about 50 percent by weight and containing a small amount of a polyfluoro-substituted emulsifying agent for the polymer, while maintaining the temperature of the aqueous colloidal dispersion in the range from 0° C.

to about 45° C., the percentage of the nonionic surfactant mixed into the aqueous colloidal dispersion being based upon the weight of the polymer, thereby separating the aqueous colloidal dispersion into a relatively clear supernatant layer and a sedimentary layer and concentrating the polytetrafluoroethylene dispersion in the sedimentary layer;

(b) separating the sedimentary layer from the supernatant layer and then thoroughly mixing into the sedimentary layer from about 1 to about 5 percent by weight of a stabilizing nonionic surfactant having a structure represented by the formula

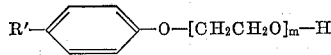

in which R' is an alkyl group containing from 8 to 10 carbon atoms, and $m$ is an integer equal to at least $[r'+1]$ but less than 20, where $r'$ is equal to the number of carbon atoms in the alkyl radical R', the percentage of the stabilizing nonionic surfactant mixed into the sedimentary layer being based on the weight of the polymer, while maintaining the temperature of the sedimentary layer in the same temperature range, to form a stabilized, concentrated polytetrafluoroethylene dispersion containing from about 65 to about 75 percent by weight of polytetrafluoroethylene particles having an average diameter in the range from about 0.05 to about 0.5 micron and being characterized by the absence of coagulated polymer particles upon electron microscope examination; and (c) recovering the resultant stabilized, concentrated polytetrafluoroethylene dispersion.

3. A process for producing stabilized, concentrated polytetrafluoroethylene dispersions consisting essentially of sequentially (a) thoroughly mixing at least two separate portions aggregating from about 6 to about 20 percent by weight of a concentrating nonionic surfactant having a structure represented by the formula

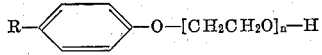

in which R is an alkyl group containing from 8 to 10 carbon atoms, and $n$ is an integer having a value in the range from $[r-1.5]$ to $[r+0.5]$, where $r$ is equal to the number of carbon atoms in the alkyl radical R, into an aqueous colloidal dispersion of polytetrafluoroethylene having a polymer solids content in the range from about 10 to about 50 percent by weight and containing a small amount of a polyfluoro-substituted emulsifying agent for the polymer, while maintaining the temperature of the aqueous colloidal dispersion in the range from 0° C. to about 45° C., the last portion of the nonionic surfactant being mixed into the aqueous colloidal dispersion at least about 30 minutes after the incorporation in the dispersion of the first portion of the nonionic surfactant, the aggregate percentage of the nonionic surfactant mixed into the aqueous colloidal dispersion being based upon the weight of the polymer, thereby separating the aqueous colloidal dispersion into a relatively clear supernatant layer and a sedimentary layer and concentrating the polytetrafluoroethylene dispersion in the sedimentary layer;

(b) separating the sedimentary layer from the supernatant layer and then thoroughly mixing into the sedimentary layer a small amount of a stabilizing nonionic surfactant having a structure represented by the formula

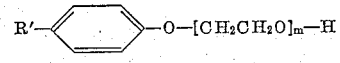

in which R' is an alkyl group containing from 8 to 10 carbon atoms, and $m$ is an integer equal to at least $[r'+1]$ but less than 20, where $r'$ is equal to the number of carbon atoms in the alkyl radical R', while maintaining the temperature of the sedimentary layer in the same temperature range, to form a stabilized, concentrated polytetrafluoroethylene dispersion containing from about 65 to about 75 percent by weight of polytetrafluoroethylene particles having an average diameter in the range from about 0.05 to about 0.5 micron and being characterized by the absence of coagulated polymer particles upon electron microscope examination; and (c) recovering the resultant stabilized, concentrated polytetrafluoroethylene dispersion.

4. A process for producing stabilized, concentrated polytetrafluoroethylene dispersions consisting essentially of sequentially (a) thoroughly mixing from about 6 to about 20 percent by weight of a concentrating nonionic surfactant having a structure represented by the formula

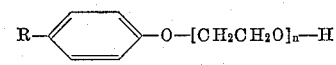

in which R is an alkyl group containing from 8 to 10 carbon atoms, and $n$ is an integer having a value in the range from $[r-1.5]$ to $[r+0.5]$, where $r$ is equal to the number of carbon atoms in the alkyl radical R, into an aqueous colloidal dispersion of polytetrafluoroethylene having a polymer solids content in the range from about 10 to about 50 percent by weight and containing a small amount of a polyfluoro-substituted emulsifying agent for the polymer, while maintaining the temperature of the aqueous colloidal dispersion in the range from 25° C. to about 40° C., the percentage of the nonionic surfactant mixed into the aqueous colloidal dispersion being based upon the weight of the polymer, thereby separating the aqueous colloidal dispersion into a relatively clear supernatant layer and a sedimentary layer and concentrating polytetrafluoroethylene dispersion in the sedimentary layer;

(b) separating the sedimentary layer from the supernatant layer and then thoroughly mixing into the sedimentary layer a small amount of a stabilizing nonionic surfactant having a structure represented by the formula

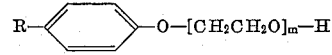

in which $m$ is an integer having a value in the range from $[2(r+1)-n]$ to $[2(r+3)-n]$, while maintaining the temperature of the sedimentary layer in the same temperature range, to form a stabilized, concentrated polytetrafluoroethylene dispersion containing from about 65 to about 75 percent by weight of polytetrafluoroethylene particles having an average diameter in the range from about 0.05 to about 0.5 micron and being characterized by the absence of coagulated polymer particles upon electron microscope examination; and (c) recovering the stabilized, concentrated polytetrafluoroethylene dispersion.

5. A process for producing stabilized, concentrated polytetrafluoroethylene dispersions consisting essentially of sequentially (a) thoroughly mixing two portions aggregating from about 6 to about 20 percent by weight of a concentrating nonionic surfactant having a structure represented by the formula

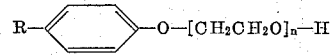

in which R is an alkyl group containing from 8 to 10 carbon atoms, and $n$ is an integer having a value in the range from $[r-1.5]$ to $[r+0.5]$, where $r$ is equal to the number of carbon atoms in the alkyl radical R, into an aqueous colloidal dispersion of polytetrafluoroethylene having a polymer solids content in the range from about 10 to about 50 percent by weight and containing a small amount of a polyfluoro-substituted emulsifying agent for the polymer, while maintaining the temperature of the aqueous colloidal dispersion in the range from 25° C. to about 40° C., the second portion of the nonionic surfactant being mixed into the aqueous colloidal dispersion at least about 30 minutes after the incorporation in the dispersion of the first portion of the nonionic surfactant, the aggregate percentage of the nonionic surfactant mixed into the aqueous colloidal dispersion being based upon the weight of the polymer, thereby separating the aqueous colloidal dispersion into a relatively clear supernatant layer and a sedimentary layer and concentrating the polytetrafluoroethylene dispersion in the sedimentary layer;

(b) separating the sedimentary layer from the supernatant layer and then thoroughly mixing into the sedimentary layer a small amount of a stabilizing nonionic surfactant having a structure represented by the formula

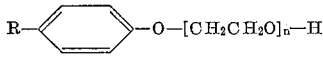

in which $m$ is an integer having a value in the range from $[2(r+1)-n]$ to $[2(r+3)-n]$, while maintaining the temperature of the sedimentary layer in the same temperature range, to form a stabilized, concentrated polytetrafluoroethylene dispersion containing from about 65 to about 75 percent by weight of polytetrafluoroethylene particles having an average diameter in the range from about 0.05 to about 0.5 micron and being characterized by the absence of coagulated polymer particles upon electron microscope examination; and (c) recovering the resultant stabilized, concentrated polytetrafluoroethylene dispersion.

6. A process for producing stabilized, concentrated polytetrafluoroethylene dispersions consisting essentially of sequentially (a) thoroughly mixing two portions aggregating from about 6 to about 20 percent by weight of a concentrating nonionic surfactant having a structure represented by the formula

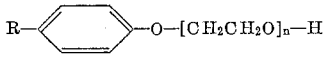

in which R is an alkyl group containing from 8 to 10 carbon atoms, and $n$ is an integer having a value in the range from $[r-1.5]$ to $[r+0.5]$, where $r$ is equal to the number of carbon atoms in the alkyl radical R, into an aqueous colloidal dispersion of polytetrafluoroethylene having a polymer solids content in the range from about 10 to about 50 percent by weight and containing a small amount of a polyfluoro-substituted emulsifying agent for the polymer, while maintaining the temperature of the aqueous colloidal dispersion in the range from 25° C. to about 40° C., the second portion of the nonionic surfactant being mixed into the aqueous colloidal dispersion at least about 30 minutes after the incorporation in the dispersion of the first portion of the nonionic surfactant, the percentage of the nonionic surfactant mixed into the aqueous colloidal dispersion being based upon the weight of the polymer, thereby separating the aqueous colloidal dispersion into a relatively clear supernatant layer and a sedimentary layer and concentrating the polytetrafluoroethylene dispersion in the sedimentary layer;

(b) separating the sedimentary layer from the supernatant layer and then thoroughly mixing into the sedimentary layer from about 1 to about 5 percent by weight of a second nonionic surfactant having a structure represented by the formula

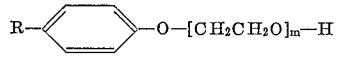

in which $m$ is an integer having a value in the range from $[2(r+1)-n]$ to $[2(r+3)-n]$, the percentage of the stabilizing nonionic surfactant mixed into the sedimentary layer being based on the weight of the polymer, while maintaining the temperature of the sedimentary layer in the same temperature range, to form a stabilized, concentrated polytetrafluoroethylene dispersion containing from about 65 to about 75 percent by weight of polytetrafluoroethylene particles having an average diameter in the range from about 0.05 to about 0.5 micron and being characterized by the absence of coagulated polymer particles upon electron microscope examination; and (c) recovering the resultant stabilized, concentrated polytetrafluoroethylene dispersion.

7. A process for producing stabilized concentrated polytetrafluoroethylene dispersions in accordance with claim 6, in which the first portion of the nonionic surfactant mixed into the aqueous colloidal dispersion comprises not more than about one-half of the aggregate amount of said nonionic surfactant incorporated into the aqueous colloidal dispersion.

8. A stabilized, concentrated polytetrafluoroethylene dispersion containing from about 65 to about 75 percent by weight of polytetrafluoroethylene particles having an average diameter in the range from about 0.05 to about 0.5 micron and being characterized by the absence of coagulated polymer particles upon electron microscope examination, and being formed upon sequentially (a) thoroughly mixing from about 6 to about 20 percent by weight of a concentrating nonionic surfactant having a structure represented by the formula

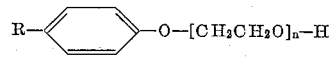

in which R is an alkyl group containing from 8 to 10 carbon atoms, and $n$ is integer having a value in the range from $[r-1.5]$ to $[r+0.5]$, where $r$ is equal to the number of carbon atoms in the alkyl radical R, into an aqueous colloidal dispersion of polytetrafluoroethylene having a polymer solids content in the range from about 10 to about 50 percent by weight and containing a small amount of a polyfluoro-substituted emulsifying agent for the polymer, while maintaining the temperature of the aqueous colloidal dispersion in the range from 0° C. to about 45° C., the percentage of the nonionic surfactant mixed into the aqueous colloidal dispersion being based upon the weight of the polymer, thereby separating the aqueous colloidal dispersion into a relatively clear supernatant layer and a sedimentary layer and concentrating the polytetrafluoroethylene dispersion in the sedimentary layer;

(b) separating the sedimentary layer from the supernatant layer and then thoroughly mixing into the sedimentary layer a small amount of a stabilizing nonionic surfactant having a structure represented by the formula

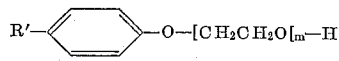

in which R' is an alkyl group containing from 8 to 10 carbon atoms, and $m$ is an integer equal to at least $[r'+1]$ but less than 20, where $r'$ is equal to the number of carbon atoms in the alkyl radical R', while maintaining the temperature of the sedimentary layer in the same temperature range, to form a stabilized, concentrated polytetrafluoroethylene dispersion containing from about 65 to about 75 percent by weight of polytetrafluoroethylene particles having an average diameter in the range from about 0.05 to about 0.5 micron and being characterized by the absence of coagulated polymer particles upon electron microscope examination; and (c) recovering the resultant stabilized, concentrated polytetrafluoroethylene dispersion.

9. A stabilized, concentrated polytetrafluoroethylene dispersion containing from about 65 to about 75 percent by weight of polytetrafluoroethylene particles having an average diameter in the range from about 0.05 to about 0.5 micron and being characterized by the absence of coagulated polymer particles upon electron microscope examination, and being formed upon sequentially (a) thoroughly mixing from about 6 to about 20 percent by weight of a concentrating nonionic surfactant having a structure represented by the formula

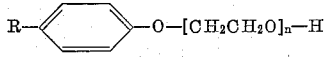

in which R is an alkyl group containing from 8 to 10 carbon atoms, and $n$ is an integer having a value in the range from $[r-1.5]$ to $[r+0.5]$, where $r$ is equal to the number of carbon atoms in the alkyl radical R, into an aqueous colloidal dispersion of polytetrafluoroethylene having a polymer solids content in the range from about 10 to about 50 percent by weight and containing a small amount of a polyfluoro-substituted emulsifying agent for the polymer, while maintaining the temperature of the aqueous colloidal dispersion in the range from 0° C. to about 45° C., the percentage of the nonionic surfactant mixed into the aqueous colloidal dispersion being based upon the weight of the polymer, thereby separating the aqueous colloidal dispersion into a relatively clear supernatant layer and a sedimentary layer and concentrating the polytetrafluoroethylene dispersion in the sedimentary layer;

(b) separating the sedimentary layer from the supernatant layer and then thoroughly mixing into the sedimentary layer a small amount of a stabilizing nonionic surfactant having a structure represented by the formula

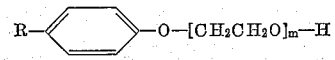

in which $m$ is an integer having a value in the range from $[2(r+1)-n]$ to $[2(r+3)-n]$, while maintaining the temperature of the sedimentary layer in the same temperature range, to form a stabilized, concentrated polytetrafluoroethylene dispersion containing from about 65 to about 75 percent by weight of polytetrafluoroethylene particles having an average diameter in the range from about 0.05 to about 0.5 micron and being characterized by the absence of coagulated polymer particles upon electron microscope examination; and (c) recovering the resultant stabilized, concentrated polytetrafluoroethylene dispersion.

10. A stabilized, concentrated polytetrafluoroethylene dispersion containing from about 65 to about 75 percent by weight of polytetrafluoroethylene particles having an average diameter in the range from about 0.05 to about 0.5 micron and being characterized by the absence of coagulated polymer particles upon electron microscope examination, and being formed upon sequentially (a) thoroughly mixing two portions aggregating from about 6 to about 20 percent by weight of a concentrating nonionic surfactant having a structure represented by the formula

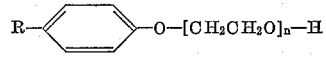

in which R is an alkyl group containing from 8 to 10 carbon atoms, and $n$ is an integer having a value in the range from $[r-1.5]$ to $[r+0.5]$, where $r$ is equal to the number of carbon atoms in the alkyl radical R, into an aqueous colloidal dispersion of polytetrafluoroethylene having a polymer solids content in the range from about 10 to about 50 percent by weight and containing a small amount of a polyfluoro-substituted emulsifying agent for the polymer, while maintaining the temperature of the aqueous colloidal dispersion in the range from 25° C. to about 40° C., the first portion of which nonionic surfactant comprises not more than about one-half of the aggregate amount of said nonionic surfactant while the second portion comprises the balance thereof and is mixed into the aqueous colloidal dispersion at least 30 minutes after the incorporation in the dispersion of the first portion, the second portion of the nonionic surfactant being mixed into the aqueous colloidal dispersion at least about 30 minutes after the incorporation in the dispersion of the first portion of the nonionic surfactant, the aggregate percentage of the concentrating nonionic surfactant mixed into the aqueous colloidal dispersion being based upon the weight of the polymer contained in the dispersion, thereby separating the aqueous colloidal dispersion into a relatively clear supernatant layer and a sedimentary layer and concentrating the polytetrafluoroethylene dispersion in the sedimentary layer;

(b) separating the sedimentary layer from the supernatant layer and then thoroughly mixing into the sedimentary layer from about 1 to about 5 percent by weight of a stabilizing nonionic surfactant having a structure represented by the formula

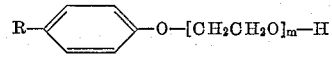

in which $m$ is an integer having a value in the range from $[2(r+1)-n]$ to $[2(r+3)-n]$, the percentage of the stabilizing nonionic surfactant mixed into the sedimentary layer being based on the weight of the polymer contained in that layer, while maintaining the temperature of the sedimentary layer in the same temperature range, to form a stabilized, concentrated polytetrafluoroethylene dispersion containing from about 65 to about 75 percent by weight of polytetrafluoroethylene particles having an average diameter in the range from about 0.05 to about 0.5 micron and being characterized by the absence of coagulated polymer particles upon electron microscope examination; and (c) recovering the resultant stabilized, concentrated polytetrafluoroethylene dispersion.

References Cited by the Examiner

UNITED STATES PATENTS 3,037,953   6/1962   Marks et al. _____ 260—29.6

MURRAY TILLMAN, *Primary Examiner.*

W. J. BRIGGS, SR., *Assistant Examiner.*

UNITED STATES PATENT OFFICE
CERTIFICATE OF CORRECTION

Patent No. 3,301,807            January 31, 1967

Juzaemon Hoashi

It is hereby certified that error appears in the above numbered patent requiring correction and that the said Letters Patent should read as corrected below.

Column 6, lines 40 to 42, the formula should appear as shown below instead of as in the patent:

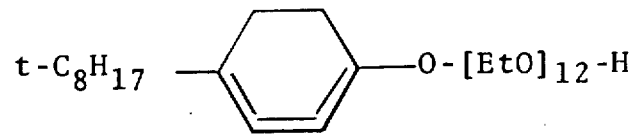

line 44, for "o fa" read -- of a --; column 12, lines 64 to 66, the formula should appear as shown below instead of as in the patent:

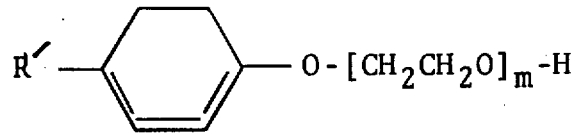

Signed and sealed this 17th day of October 1967.

(SEAL)
Attest:

EDWARD M. FLETCHER, JR.          EDWARD J. BRENNER
Attesting Officer                Commissioner of Patents

UNITED STATES PATENT OFFICE
CERTIFICATE OF CORRECTION

Patent No. 3,301,807            January 31, 1967

Juzaemon Hoashi

It is hereby certified that error appears in the above numbered patent requiring correction and that the said Letters Patent should read as corrected below.

Column 6, lines 40 to 42, the formula should appear as shown below instead of as in the patent:

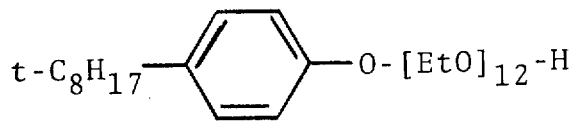

line 44, for "o fa" read -- of a --; column 12, lines 64 to 66, the formula should appear as shown below instead of as in the patent:

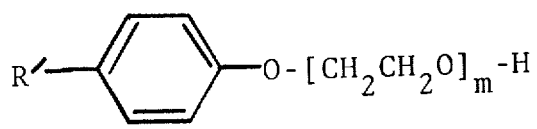

This certificate supersedes Certificate issued October 17, 1967.

Signed and sealed this 25th day of June 1968.

(SEAL)
Attest:

EDWARD M. FLETCHER, JR.
Attesting Officer

EDWARD J. BRENNER
Commissioner of Patents